G. B. Peers.

Vegetable Cutter.

Nº 87,195.    Patented Feb. 23, 1869.

Witnesses:
Wm A Morgan
P. C Dieterich

Inventor,
G. B Peers
per Munn & Co
Attorneys

GEORGE B. PEERS, OF FARMINGTON, MISSOURI.

Letters Patent No. 87,195, dated February 23, 1869.

IMPROVEMENT IN VEGETABLE-SLICERS.

The Schedule referred to in these Letters Patent and making part of the same.

*To all whom it may concern:*

Be it known that I, GEORGE B. PEERS, of Farmington, in the county of St. François, and State of Missouri, have invented a new and useful Improvement in Vegetable-Slicer; and I do hereby declare that the following is a full, clear, and exact description thereof, which will enable others skilled in the art to make and use the same, reference being had to the accompanying drawings, forming part of this specification.

This invention relates to improvements in machines for slicing vegetables, whereby it is designed, by the employment of a rotary disk provided with radial and vertical knives, arranged to rotate in a helical shell, into the mouth of which the vegetables are fed, to provide a cheap, simple, and effective apparatus.

In the accompanying drawings—

Similar letters of reference indicate like parts.

Figure 1:
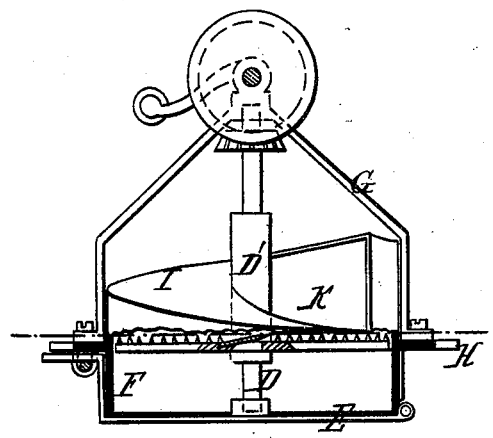
Figure 1 represents an elevation of my improved machine, partly in section.
Figure 2:
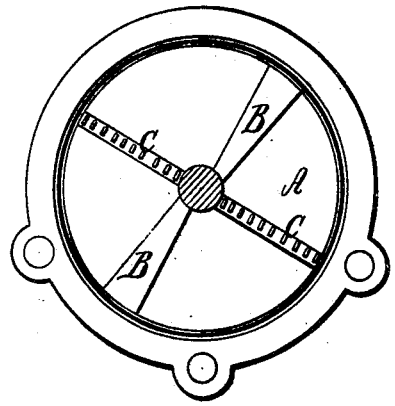
Figure 2 represents a horizontal section of the same, taken on the line *x x* of fig. 1.

A represents a disk, provided with radial knives B, arranged angularly to the horizontal plane of the said disk, adjacent to passages through the same, and with vertical cutters C, arranged upon slides placed in radial dovetailed grooves in the face of the disk, so as to be readily put in or taken out.

The said disk is provided with a shaft, D, stepped in a bridge-tree, E, hinged to the circular projection F, of the shell of the apparatus.

The shaft D is supported at its upper end by the bridge G, and provided with gear-wheels, and a driving-crank, for communicating rotary motion to it.

D' is a sleeve, applied to the shaft D, to prevent the disk A from sliding upward upon the shaft.

Above the projection F, a flange, H, is provided, for securing the apparatus to a table, or to a platform, and from the said flange rises a helical shell, forming a guide or curb, into the open enlarged end of which the vegetables to be operated on are placed, the said opening being represented at K.

The rotary motion of the disk, on which the vegetable will rest, will carry it around under the inclined top of the curb I, between which and the said disk the article will be so wedged, that the knives B will readily cut it into slices, which will be delivered through the openings in the said disk, and the vertical cutters C will cut the slices in the vertical direction, and are designed to be used when it is desired to cut the vegetables finely, but may be taken out when it is only desired to cut them into slices.

Having thus described my invention,

I claim as new, and desire to secure by Letters Patent—

1. The rotary disk A, provided with the knives B, and either with or without the knives C, and combined with the helical case or curb I, and a shaft for rotating it, substantially as and for the purpose specified.

2. The arrangement of the bridge-tree E, disk A, shaft D, and sleeve D', substantially as and for the purpose specified.

3. The arrangement of scroll I, flange H, projection F, and the bridges E and G, all substantially as and for the purpose specified.

GEO. B. PEERS.

Witnesses:
J. H. DUNKLIN,
E. J. DALTON.